No. 850,348. PATENTED APR. 16, 1907.
D. A. COWAN.
CORNER CLAMP FOR PLATE GLASS STRUCTURES.
APPLICATION FILED MAY 6, 1904.
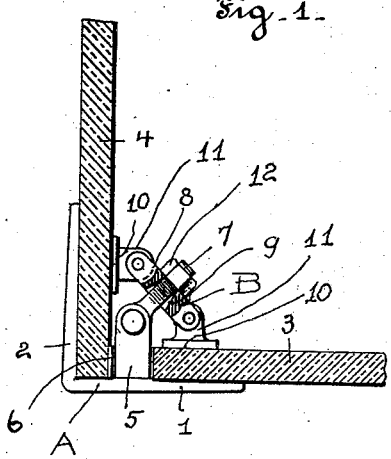
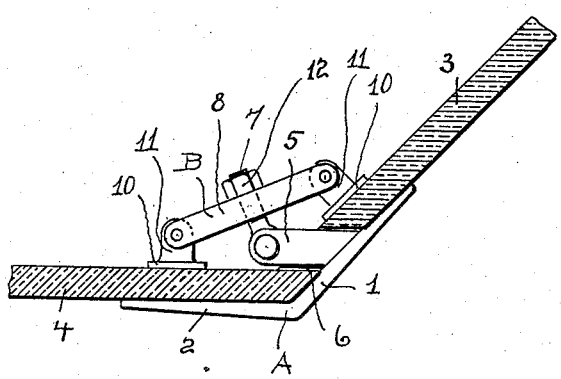
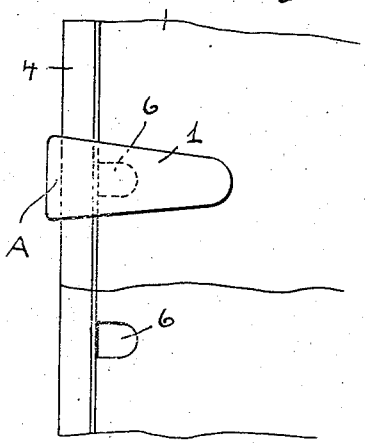
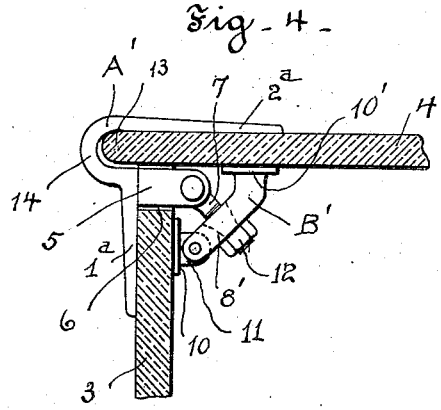
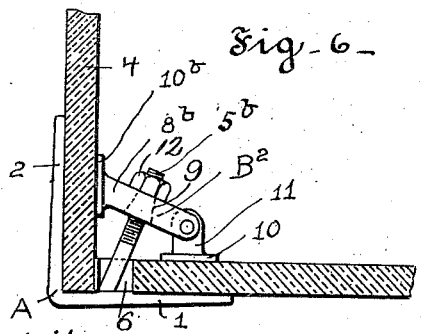
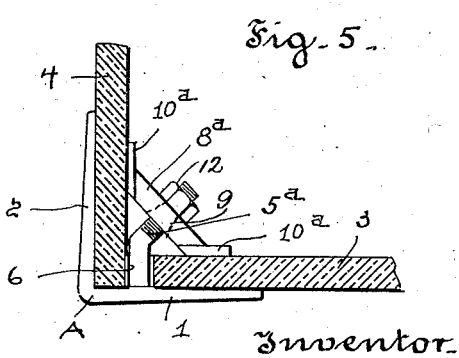
Witnesses—
Chas. A. Boake
H. C. Powell
Inventor
Duncan A. Cowan
By Wilson & Martin
Attorneys

UNITED STATES PATENT OFFICE.

DUNCAN A. COWAN, OF TOLEDO, OHIO.

CORNER-CLAMP FOR PLATE-GLASS STRUCTURES.

No. 850,348.  Specification of Letters Patent.  Patented April 16, 1907.

Application filed May 6, 1904. Serial No. 206,626.

*To all whom it may concern:*

Be it known that I, DUNCAN A. COWAN, a citizen of the Dominion of Canada, residing at Toledo, Lucas county, Ohio, have invented a new and useful Improvement in a Corner-Clamp for Plate-Glass Structures, of which the following is a specification.

My invention relates to a corner-clamp for plate-glass structures, and has for its object to provide a device of the kind that is adapted to so marginally lock glass plates together at an angle-joint that one or both plates may work to settle without injury to either plate and that to so lock an angle requires only one of the plates to be marginally notched to permit the assembling and attachment of the clamp to the plates.

The objects of my invention are accomplished as hereinafter described, and illustrated in the drawings, in which—

Figure 1 is a plan view, partly in section, of my clamp in position to secure two plates of glass joined at a right angle. Fig. 2 is a side elevation of the clamp in such position. Fig. 3 shows a clamp adapted to secure plates of glass joined at an angle other than a right angle. Fig. 4 shows the outer clamp member adapted to secure the glass top of a show-case to the glass sides thereof and a modified form of the inner clamping member. Figs. 5 and 6 show forms of rigid coupling-bolts for the clamp members and modified forms of the inner clamp member.

My corner-clamp comprises the outer clamp member A and the inner clamp member B. The outer clamp member A comprises an angle-plate having legs 1 and 2, preferably of equal length and arranged at the desired joining angle of the glass plates 3 and 4, formed by abutting an edge of plate 3 against a side of plate 4, a stud 5, projecting from the inner face of leg 1, preferably parallel with leg 2 and at a distance therefrom slightly more than the thickness of plate 4 and being of a length to extend through a suitable marginal incut 6, formed in the abutting edge of the plate 3 and into the inner angle formed by the plates, and an eyebolt 7, pivoted to the free end of the stud 5, the pivotal center of the eyebolt being at a point in a line bisecting the said inner angle. The inner clamp member B comprises the brace-bar 8, of suitable length and having an orifice 9 central of its length, and the clamp-shoes 10, faced to contact with the inner faces of the plates and preferably pivotally connected with the ends of the bar 8 by centrally-disposed shanks 11 integral with the shoes and extending at right angles therefrom.

In assembling the members the bar 8 and the shanks 11 are disposed in a plane at right angles to the faces of the shoes 10, the plates 3 and 4, and the legs 1 and 2 and extending longitudinally through the legs of the angle-plate A with the bar 8 at right angles to a line bisecting the inner angle of the plates and with the eyebolt 7 extended through the orifice 9 in the brace-bar 8. Thus arranged and assembled the outer and inner clamp members are compressed oppositely on the plates by the nut 12, run on the threaded free end of the eyebolt projecting through the bar 8. The orifice 9 is preferably conically enlarged toward the inner angle of the plates, whereby when the nut is tightened on the brace-bar the clamp member B is made automatically adjustable to a slight difference of thickness of the plates.

By pivoting the shoes to the ends of a bar 8 of a length suitable to the angle of the plates the same shoes are adapted for use with different angles of joining the plates, and the inner clamp member B is made automatically adjustable to the angle of the plates. It is manifest, however, that for the member B may be substituted the member B', having a shoe 10' formed integral with one end of the bar 8' at an angle thereto adjusted to the desired angle of joining of the plates, as shown in Fig. 4, with a floating shoe 10 at the opposite end, and that an inner clamp member so constructed will also be automatically adjustable to the angle of joining as it is compressed on the plates. I therefore do not limit myself to having both shoes made adjustable. In Fig. 4 is also shown an outer clamp member A', adapted to secure plates joined at an angle where one plate has a marginal overlap and which is more especially adapted to secure the top plate of a show-case to the side and end plates of the case, so as to form a marginal projection 13 of the plate. As adapted to this purpose the outer clamp member is provided with the U-shaped curved portion 14, connecting the legs 1ᵃ and 2ᵃ and adapted to receive the marginal projection of the top plate.

In Fig. 5 is shown a modified form of coupling stud-bolt 5ᵃ, which extends from leg 1 parallel with the leg 2, through the incut of the plate 3, within the angle of the plates, and is there bent to equally divide the angle.

In this figure is also shown a modified form of brace-bar 8ª, which has the shoes 10ª integral with the ends of the bar at an angle adapting them to the desired joining angle of the plates.

In Fig. 6 is shown another modified form of stud-bolt 5ᵇ, which may be substituted for the stud 5 and eyebolt 7 and which extends from the leg 1 through the incut 6 at an angle from the abutting face of the plate 4. In Fig. 6 is also shown a modified form of inner clamp member B², in which the brace-bar 8ᵇ, which is provided with an integral shoe 10ᵇ, at one end formed to the desired joining angle of the plates and with a floating shoe 10 at the other end, and the threaded free end of the stud-bolt 5ᵇ extends through the orifice 9, central in the bar 8ᵇ, and the clamp members are compressed on the plates by a nut 12, run on the bolt, as in the other form shown.

From the foregoing it is manifest that without departing from the principle of construction and operation of my clamp any of the different forms of coupling-bolts shown may be used with any of the different forms of inner clamp members and that, used in any of the forms shown or with the parts interchanged, as aforesaid, the clamp is adapted to firmly and safely secure angle-joints of glass plates without requiring more than a single notch in the edge of one plate for its attachment, and that by such form of attachment the plates may work to settle without injury to either plate, this freedom to settle with other parts of a building being highly essential to glass structures and not possible to be attained where both plates of a corner are drilled or notched for the attachment of a securing device.

What I claim to be new is—

1. In a corner structure, the combination with two plates joined at an angle with the side of one plate abutting the end of the other and forming a corner, of a marginal incut in the end of one of the plates, extending away from the end and beyond the inner face of the other plate; and a corner-clamp comprising an outer clamping member adapted to engage the outer face of each plate, an inner clamping member adapted to engage the inner face of each plate opposite the outer clamping member, and a coupling member extending through the incut, and adapted to connect the outer and inner clamping members and compress them oppositely on the plates, said coupling member being entirely on one side of and free from the plate abutting the plate having the incut through which the coupling member extends.

2. In a corner structure, the combination with two plates joined at an angle, with the side of one plate abutting the end of the other and forming a corner, of a marginal incut in the abutting end of the end abutting plate, extending from the plane of the joint; an outer clamping member adapted to engage the outer face of each plate; an inner clamping member adapted to engage the inner face of each plate; and a coupling member extending through the incut and adapted to connect the outer and inner clamping members and compress them oppositely on the plates, said coupling member being entirely on one side of the plane of the joint, and free from the side abutting plate.

3. In a corner-clamp for plate-glass structures, in combination, an outer clamping member comprising legs inwardly faced and extending at an angle from each other; an inner clamping member comprising a brace-bar having a central orifice, and end shoes adapted respectively to be brought each face to face and parallel with the inner face of a leg of the outer clamping member; a coupling-bolt connected with one of the legs of the outer clamping member at a distance away from the inner angle formed by the legs equal to the thickness of one or two plates joined to form a corner, said coupling-bolt having a threaded end portion adapted to extend through the orifice of the brace-bar, and a nut adapted to be run on the threaded end portion of the bolt.

4. In a corner-clamp for plate-glass structures the combination with an outer clamping member adapted to engage the outer faces of plates formed as a corner, and having a coupling member extending through the corner, of an inner clamping member comprising a brace-bar adapted to be engaged by the coupling member, and shoes pivotally secured to the ends of the brace-bar, said shoes being adapted to be automatically adjusted, at different angles to the brace-bar, to face engagement with the inner faces of the plates forming the corner, when compressed thereon by the coupling member.

5. In a device of the class described, in combination, a pair of angularly-disposed legs adapted to rest against the outer face of two abutting plates, a member attached to one of said legs and having an inclined extension lying in the angle between said legs, and a clamping-block attached to said extension.

6. A fastening device for connecting plates, comprising a member having angularly-disposed legs, a stud attached to one of said legs, adapted to pass between the edges of said plates and having an inclined threaded extension lying in the angle between said legs, and a clamping member attaching to the same and engaging the faces of said plates.

In testimony whereof I have hereunto set my hand this 4th day of May, 1904.

DUNCAN A. COWAN.

Witnesses:
IRVING E. MACOMBER,
ANNA M. FRIEDRICHS.